United States Patent
Jeffery et al.

(10) Patent No.: US 9,100,154 B1
(45) Date of Patent: Aug. 4, 2015

(54) METHOD AND SYSTEM FOR EXPLICIT AP-TO-AP SOUNDING IN AN 802.11 NETWORK

(71) Applicant: Magnolia Broadband Inc., Englewood, NJ (US)

(72) Inventors: Stuart S. Jeffery, Los Altos, CA (US); Haim Harel, New York, NY (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/449,431

(22) Filed: Aug. 1, 2014

Related U.S. Application Data

(60) Provisional application No. 61/955,433, filed on Mar. 19, 2014.

(51) Int. Cl.
| | |
|---|---|
| *H04L 1/00* | (2006.01) |
| *H04L 5/00* | (2006.01) |
| *H04W 24/02* | (2009.01) |
| *H04B 7/04* | (2006.01) |

(Continued)

(52) U.S. Cl.
CPC .............. *H04L 5/005* (2013.01); *H04B 7/0452* (2013.01); *H04L 5/0053* (2013.01); *H04L 5/0073* (2013.01); *H04W 24/02* (2013.01); *H04W 84/12* (2013.01); *H04W 88/08* (2013.01)

(58) Field of Classification Search
CPC .............. H04W 74/0816; H04W 16/28; H04B 7/0452; H04B 7/0617; H04L 1/0048
USPC ......... 370/220, 252, 338; 455/456.1; 342/373
See application file for complete search history.

(56) References Cited

U.S. PATENT DOCUMENTS

| 4,044,359 A | 8/1977 | Applebaum et al. |
|---|---|---|
| 4,079,318 A | 3/1978 | Kinoshita |

(Continued)

FOREIGN PATENT DOCUMENTS

| EP | 1 189 303 | 3/2002 |
|---|---|---|
| EP | 1 867 177 | 5/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Wei Zhao
*Assistant Examiner* — Lionel Preval
(74) *Attorney, Agent, or Firm* — Pearl Cohen Zedek Latzer Baratz LLP

(57) ABSTRACT

A method of one AP accessing a channel occupied by a neighboring AP within CCA range, by acquiring channel knowledge via performing cooperative sounding and setting a null towards the neighboring AP, under certain conditions verifications, is provided herein. The method may include: transmitting and receive signals via a plurality of radio circuitries connected to plurality of antennas; monitoring signals received by the radio circuitries and generating a list of neighboring co-channel access points that each has plurality of antennas and are further located within a clear channel assessment (CCA) range of the access point; and instructing the radio circuitries to transmit a sounding sequence to the list of neighboring access points, and receive Channel State Information (CSI).

23 Claims, 13 Drawing Sheets

(51) Int. Cl.
  *H04W 84/12* (2009.01)
  *H04W 88/08* (2009.01)

(56) References Cited

U.S. PATENT DOCUMENTS

| | | |
|---|---|---|
| 4,359,738 A | 11/1982 | Lewis |
| 4,540,985 A | 9/1985 | Clancy et al. |
| 4,628,320 A | 12/1986 | Downie |
| 5,162,805 A | 11/1992 | Cantrell |
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,936,577 A | 8/1999 | Shoki et al. |
| 5,940,033 A | 8/1999 | Locher et al. |
| 6,018,317 A | 1/2000 | Dogan et al. |
| 6,026,081 A | 2/2000 | Hamabe |
| 6,046,655 A | 4/2000 | Cipolla |
| 6,094,165 A | 7/2000 | Smith |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,259,683 B1 | 7/2001 | Sekine et al. |
| 6,297,772 B1 | 10/2001 | Lewis |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,584,115 B1 | 6/2003 | Suzuki |
| 6,647,276 B1 | 11/2003 | Kuwahara et al. |
| 6,697,622 B1 | 2/2004 | Ishikawa et al. |
| 6,697,633 B1 | 2/2004 | Dogan et al. |
| 6,834,073 B1 | 12/2004 | Miller et al. |
| 6,842,460 B1 | 1/2005 | Olkkonen et al. |
| 6,914,890 B1 | 7/2005 | Tobita et al. |
| 6,927,646 B2 | 8/2005 | Niemi |
| 6,934,541 B2 | 8/2005 | Miyatani |
| 6,975,582 B1 | 12/2005 | Karabinis et al. |
| 6,987,958 B1 | 1/2006 | Lo et al. |
| 7,068,628 B2 | 6/2006 | Li et al. |
| 7,154,960 B2 | 12/2006 | Liu et al. |
| 7,177,663 B2 | 2/2007 | Axness et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,391,757 B2 | 6/2008 | Haddad et al. |
| 7,392,015 B1 | 6/2008 | Farlow et al. |
| 7,474,676 B2 | 1/2009 | Tao et al. |
| 7,499,109 B2 | 3/2009 | Kim et al. |
| 7,512,083 B2 | 3/2009 | Li |
| 7,606,528 B2 | 10/2009 | Mesecher |
| 7,634,015 B2 | 12/2009 | Waxman |
| 7,646,744 B2 | 1/2010 | Li |
| 7,719,993 B2 | 5/2010 | Li et al. |
| 7,742,000 B2 | 6/2010 | Mohamadi |
| 7,769,107 B2 | 8/2010 | Sandhu et al. |
| 7,876,848 B2 | 1/2011 | Han et al. |
| 7,881,401 B2 | 2/2011 | Kraut et al. |
| 7,898,478 B2 | 3/2011 | Niu et al. |
| 7,904,086 B2 | 3/2011 | Kundu et al. |
| 7,904,106 B2 | 3/2011 | Han et al. |
| 7,933,255 B2 | 4/2011 | Li |
| 7,970,366 B2 | 6/2011 | Arita et al. |
| 8,078,109 B1 | 12/2011 | Mulcay |
| 8,103,284 B2 | 1/2012 | Mueckenheim et al. |
| 8,111,782 B2 | 2/2012 | Kim et al. |
| 8,115,679 B2 | 2/2012 | Falk |
| 8,155,613 B2 | 4/2012 | Kent et al. |
| 8,194,602 B2 | 6/2012 | van Rensburg et al. |
| 8,275,377 B2 | 9/2012 | Nanda et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,504,098 B2 | 8/2013 | Khojastepour |
| 8,509,190 B2 | 8/2013 | Rofougaran |
| 8,520,657 B2 | 8/2013 | Rofougaran |
| 8,526,886 B2 | 9/2013 | Wu et al. |
| 8,571,127 B2 | 10/2013 | Jiang et al. |
| 8,588,844 B2 | 11/2013 | Shpak |
| 8,599,955 B1 | 12/2013 | Kludt et al. |
| 8,599,979 B2 | 12/2013 | Farag et al. |
| 8,605,658 B2 | 12/2013 | Fujimoto |
| 8,644,413 B2 | 2/2014 | Harel et al. |
| 8,649,458 B2 | 2/2014 | Kludt et al. |
| 8,666,319 B2 | 3/2014 | Kloper et al. |
| 8,670,504 B2 | 3/2014 | Naguib |
| 8,744,511 B2 | 6/2014 | Jones et al. |
| 8,754,810 B2 | 6/2014 | Guo et al. |
| 8,767,862 B2 | 7/2014 | Abreu et al. |
| 8,780,743 B2 | 7/2014 | Sombrutzki et al. |
| 8,797,969 B1 | 8/2014 | Harel et al. |
| 8,891,598 B1 | 11/2014 | Wang et al. |
| 8,942,134 B1 | 1/2015 | Kludt et al. |
| 8,976,845 B2 | 3/2015 | O'Keeffe et al. |
| 9,035,828 B2 | 5/2015 | O'Keeffe et al. |
| 2001/0029326 A1 | 10/2001 | Diab et al. |
| 2001/0038665 A1 | 11/2001 | Baltersee et al. |
| 2002/0024975 A1 | 2/2002 | Hendler |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2002/0181426 A1 | 12/2002 | Sherman |
| 2002/0181437 A1 | 12/2002 | Ohkubo et al. |
| 2003/0087645 A1 | 5/2003 | Kim et al. |
| 2003/0114162 A1 | 6/2003 | Chheda et al. |
| 2003/0153322 A1 | 8/2003 | Burke et al. |
| 2003/0153360 A1 | 8/2003 | Burke et al. |
| 2003/0186653 A1 | 10/2003 | Mohebbi et al. |
| 2003/0203717 A1 | 10/2003 | Chuprun et al. |
| 2003/0203743 A1 | 10/2003 | Sugar et al. |
| 2004/0023693 A1 | 2/2004 | Okawa et al. |
| 2004/0056795 A1 | 3/2004 | Ericson et al. |
| 2004/0063455 A1 | 4/2004 | Eran et al. |
| 2004/0081144 A1 | 4/2004 | Martin et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0166902 A1 | 8/2004 | Castellano et al. |
| 2004/0198292 A1 | 10/2004 | Smith et al. |
| 2004/0228388 A1 | 11/2004 | Salmenkaita |
| 2004/0235527 A1 | 11/2004 | Reudink et al. |
| 2004/0264504 A1 | 12/2004 | Jin |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |
| 2005/0254513 A1 | 11/2005 | Cave et al. |
| 2005/0265436 A1 | 12/2005 | Suh et al. |
| 2005/0286440 A1 | 12/2005 | Strutt et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |

(56) References Cited

U.S. PATENT DOCUMENTS

| | | |
|---|---|---|
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1* | 8/2010 | Wax et al. ............... 370/338 |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1* | 4/2012 | Hosoya et al. ............... 342/373 |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1* | 3/2013 | Wang et al. ............... 370/252 |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1* | 7/2013 | Kazmi et al. ............... 455/456.1 |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |

(56) References Cited

U.S. PATENT DOCUMENTS

| | | | |
|---|---|---|---|
| 2013/0242853 A1 | 9/2013 | Seo et al. | |
| 2013/0242899 A1 | 9/2013 | Lysejko et al. | |
| 2013/0242965 A1 | 9/2013 | Horn et al. | |
| 2013/0242976 A1 | 9/2013 | Katayama et al. | |
| 2013/0252621 A1 | 9/2013 | Dimou et al. | |
| 2013/0272437 A1 | 10/2013 | Eidson et al. | |
| 2013/0301551 A1 | 11/2013 | Ghosh et al. | |
| 2013/0331136 A1 | 12/2013 | Yang et al. | |
| 2013/0343369 A1 | 12/2013 | Yamaura | |
| 2014/0010089 A1 | 1/2014 | Cai et al. | |
| 2014/0010211 A1 | 1/2014 | Asterjadhi et al. | |
| 2014/0029433 A1 | 1/2014 | Wentink | |
| 2014/0071873 A1 | 3/2014 | Wang et al. | |
| 2014/0086077 A1 | 3/2014 | Safavi | |
| 2014/0086081 A1 | 3/2014 | Mack et al. | |
| 2014/0098681 A1* | 4/2014 | Stager et al. | 370/252 |
| 2014/0119288 A1 | 5/2014 | Zhu et al. | |
| 2014/0154992 A1 | 6/2014 | Silverman et al. | |
| 2014/0185501 A1 | 7/2014 | Park et al. | |
| 2014/0185535 A1 | 7/2014 | Park et al. | |
| 2014/0192820 A1 | 7/2014 | Azizi et al. | |
| 2014/0204821 A1 | 7/2014 | Seok et al. | |
| 2014/0241182 A1 | 8/2014 | Smadi | |
| 2014/0242914 A1 | 8/2014 | Monroe | |
| 2014/0307653 A1 | 10/2014 | Liu et al. | |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.

(56) References Cited

OTHER PUBLICATIONS

Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, no. Ljubljana; Jan. 7, 2009, pp. 1-4.
Alcatel-Lucent Shanghai Bell et al., "Antenna Array Calibration for TDD CoMP", 3GPP Draft; R1100427, 3rd Generation Partnership Project (3GPP), Mobile Competence Centre; 650, Route Des Lucioles; F06921 Sophia-Antipolis Cedex; France, Vol. RAN WG1, no. Valencia, Spain; Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference On, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.

* cited by examiner

METHOD AND SYSTEM FOR EXPLICIT AP-TO-AP SOUNDING IN AN 802.11 NETWORK

CROSS-REFERENCE TO RELATED APPLICATIONS

This application claims benefit from U.S. provisional patent application Ser. No. 61/955,433 filed on Mar. 19, 2014, which is incorporated herein by reference in its entirety.

FIELD OF THE INVENTION

The present invention relates generally to wireless communication, and more specifically to high efficiency Wi-Fi.

BACKGROUND OF THE INVENTION

Prior to setting forth the background of the invention, it may be helpful to set forth definitions of certain terms that will be used hereinafter.

The term "Wi-Fi" as used herein is defined as any wireless local area network (WLAN) products that are based on the Institute of Electrical and Electronics Engineers (IEEE) 802.11 standards.

The term "Access Point" or "AP" as used herein is defined as a device that allows wireless devices (also known as User Equipment or "UE") to connect to a wired network using Wi-Fi, or related standards. The AP usually connects to a router (via a wired network) as a standalone device, but it can also be an integral component of the router itself.

The term "client" as used herein is defined as any device that has wireless communication capabilities, specifically, the IEEE 802.11 standards. A client may be for example a smart telephone, a laptop, a tablet or a personal computer (PC).

The notation "STA" as used herein is defined in as an IEEE 802.11 client.

The term "BSS" is an acronym for Basic Service Set, which is typically a cluster of stations supported by an AP.

The term "node" as used herein is defined as general name for both IEEE 802.11 AP and IEEE 802.11 STA.

The term "serving AP" as used herein is defined in relation to one AP and one STA, wherein the STA is registered to the AP, and the AP and STA are sending and receiving data to and from each other.

The term "neighboring APs" or "neighboring nodes" relate to two co-frequency (or co-channel) APs or nodes that are within each other's sensitivity range, e.g. at least one of them can receive the other in such an signal-to-noise ratio to allows decoding of signals.

The term "CCA range" as used herein is a range between two IEEE 802.11 nodes, wherein at least one node can receive the other's transmission at a power level equal or larger than "CCA Level" e.g. −82 dBm.

The term "CSMA/CA" stands for Carrier-Sense-Multiple-Access/Collision-Avoidance, representing a requirement to listen before transmitting in a multi-node wireless system that shares a common channel on the basis of first-come-first-served.

The term "preamble" as used herein describes a certain 802.11 transmitted signal modulation appearing at the beginning of each packet, that when received by other 802.11 nodes, will force them to yield channel access.

The notation "SINR" stands for Signal to Interference and Noise.

The term "ACK" as used herein, stands for acknowledgement, and is defined as the signal transmitted from an IEEE 802.11 receiving node to the IEEE 802.11 node that has transmitted a packet to it, provided the packet was successfully received.

The term "time division duplex" (TDD) as used herein refers to systems using the same frequency spectrum for methods of communications in a time division manner such as Wi-Fi systems.

The term "channel sounding" as used herein refers to the process defined in 802.11 specifications that enables the full dimensionality of the radio channel to be determined. One sounding technique described in the 802.11 specifications is for an AP to transmit a Null Data Packet (NDP), a packet without a MAC frame.

The term "implicit feedback" or "implicit sounding" as used herein refers to a process used for TDD protocols such as Wi-Fi, where both down and up links share the same spectrum. In the aforementioned process, the uplink channel estimated by the AP, is assumed to be identical to the downlink one—based on reciprocity principle—and is therefore is considered by the AP to represent the channel towards the client/STA.

The term "explicit AP-STA feedback" or "explicit sounding" as used herein refers to a procedure where AP transmissions are channel estimated by the STA, and then fed back to the AP, providing it with the magnitude of phase and amplitude differences between the signals as transmitted by the AP vis-à-vis as received by the client/STA, allowing it to gauge possible distortions and correct them.

The term "associated STA" as used herein refers to a STA that is served by a certain AP with a certain Service Set Identifier (SSID).

The term "non-associated STA" as used herein refers to a STA within the range of the non-serving AP.

The acronym "NAV" stands for Network-Allocation-Vector and represents virtual carrier sense mechanism, used by a Wi-Fi transmitting message to broadcast the predicted duration of its transmission, signaling to other nodes how long the channel will be occupied.

The acronym "RTS" stands for Request-To-Send, and represents a message transmitted by one Wi-Fi node to another, probing it for information about its availability to receive data, per the Wi-Fi Alliance protocol.

The acronym "CTS" stands for Clear-To-Send, and represents a positive response from the other node to the node originating the RTS, indicating to the requesting node that the channel is clear from its point of view as well.

The notation "DURATION" is a message embedded in both RTS and CTS, representing a prediction of the future traffic about to be transmitted between two nodes that have captured the channel; other nodes that receive it, must clear the channel as long as the DURATION has not expired; other nodes that have received the RTS but received the CTS (hidden nodes) will avoid accessing the channel, allowing the receiving node to successfully complete the reception.

The acronym "FLA" stands for Fast Link Adaptation, and represents processes that reduce transmitting side learning time of the receiver's SINR.

The acronym "MCS" stands for Modulation Coding Scheme, mapping SINR to modulation order and code rate.

The term "beamformer" as used herein relates to a node that generates a spatial pattern, created by two or more antennas, formed in such a way that significantly in the power level received by a given receiver being a "beamformee".

The term "null" as used herein, is a spatial pattern, created by two or more antennas, formed in such a way that significantly reduces the power level received by a given receiver (e.g., a local minimum). An "Rx Null" is a null formed by a receiver's antennas weight in order to decrease undesired signal level. A "Tx Null" is formed by transmitter's antennas weights in order to decrease its undesired transmitted signal at remote receiver's input.

The term "actual null depth" as used herein, is the estimated value of the null after a certain time period has elapse since the last explicit sounding in which the amplitude and the phase have drifted so as to yield null degradation. The actual null depth is the original null taking account the estimated null degradation.

APSS is an acronym for AP Sounding Set. This is a cluster of APs that work together with mutual sounding process to reduce interference according to this invention.

The term "AP Beacon" is a management signal that is transmitted at regular intervals (typically about 10 times per second) that indicates capability of the AP. The Beacon frame contains both mandatory information (such as SSID) and optional data that may include vendor specific information. This vendor specific data field is used to indicate the AP as an APSS capable.

AP* indicates an AP which is compatible with APSS, meaning it is equipped with special software so that it can participate in APSS, either as a sounder or as a responder.

AP*_1 indicated an AP that initiates the APSS process. If multiple AP* are present, then multiple APSS's exist.

APSS_ID indicated an N bit random code selected by AP*_1 to identify the APSS that it has created (e.g. N=12).

AP*_i indicates an AP member in a group of APs that is a recipient of an AP*_1's initiation of an APSS process, where I {2 . . . n} is the designator for the different AP* that are members of the APSS_ID. Also labeled as "Compatible Access Point".

According to current IEEE 802.11 air protocols, two neighboring APs can download traffic (e.g. radio signals including data) over the same frequency channel to their respective STAs at the same time as long as these APs are not within CCA range of each other. When an RTS/CTS procedure is used, an additional condition is introduced. Namely, a legacy STA receiving the download traffic from its serving AP, must not be within CCA range of other neighboring APs or the STA they are supporting, if the AP is occupying the channel.

In many deployments APs on the same radio channel are within CCA range of each other; thus, an AP may be blocked from transmitting to its client STA due to activity of a neighboring nearby AP.

SUMMARY OF THE INVENTION

Embodiments of the present invention disclose a protocol modification that allows a group of 802.11 nodes that are MIMO capable, to access an occupied channel, using novel procedure that enables acquiring knowledge of the channel between APs, based on setting up an explicit beamformer-beamformee handshake.

According to some embodiments, an AP equipped with Tx/RX MIMO capability may serve several STAs while simultaneously null its transmitted signal toward the interfering AP, based on acquiring channel knowledge via a sounding process targeted at neighboring APs, similar to explicit sounding process defined for 802.11ac beamforming and MU-MIMO targeted at served STAs.

Embodiments of a MU-MIMO procedure are described herein, enabling a neighboring AP to access a channel already occupied by another downloading AP; the procedure may be initiated by establishing a subgroup of neighboring APs which agree to adhere to a mutual sounding protocol, e.g. subscribe to an AP Sounding Set (APSS), exchanging invites and accepts to the set, and performing mutual sounding handshakes that enable acquisition of each other's channel information, consequently used for null setting towards each other—also labeled as beamformer-beamformee nulling process.

Each of the aforementioned member AP may perform an APSS initialization by surveying the neighboring co-channel APs periodically, listing those who are within its CCA range, and eliminating from the list ones that are not APSS capable, and ones that are too strong to be nulled, e.g., ones that cannot be pushed below CCA Level via nulling, either due to limited nulling capability, or due to a very close proximity, or both.

The aforementioned beamformer's nulling capability is defined as the power level difference between its trained null towards the Beamformee, and its Omni directional antenna pattern, as received by the Beamformee's receiver.

Such nulling capability is estimated by a beamformer AP via periodical sounding of the APs that are within its CAA range, and by then interpolating the acquired phase and amplitude accuracy deterioration over time, which has elapsed from last sounding.

Successful nulling capability verification may allow a beamformer AP to access (for downloading purposes) a channel occupied by the downloading beamformee AP, provided certain additional conditions are met.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1A:
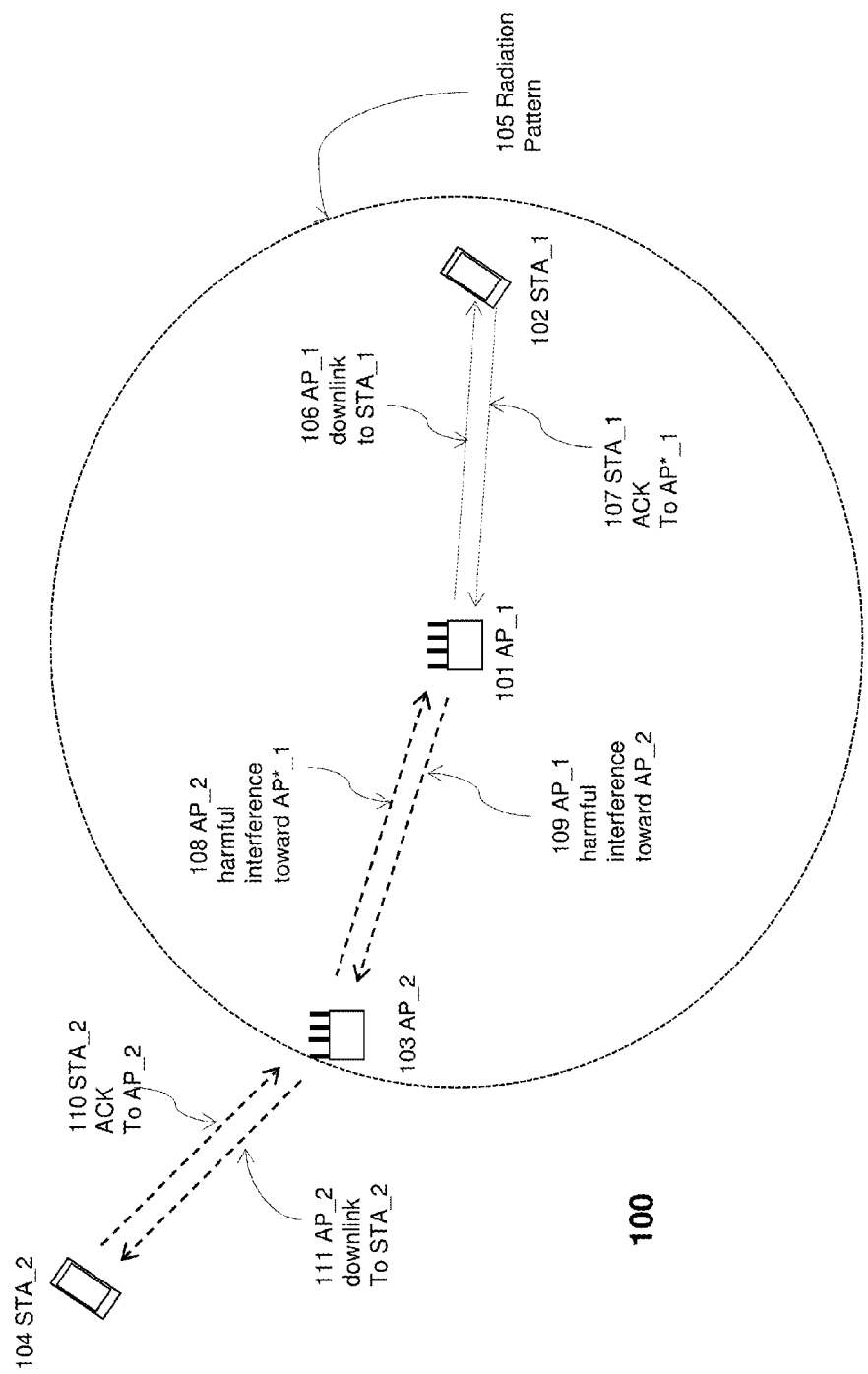
FIG. 1A is a block diagram illustrating a typical operational environment in accordance with the prior art.

FIG. 1A is an apparatus illustrating an area covered by two access points in accordance with the prior art. AP__1 101 is assumed to be equipped with an omni directional antenna pattern 105, that schedules downloading a packet to one of its served Stations STA__1 102, and is blocked by its previously set NAV or DURATION invoked by a neighboring AP__2 103 which has already seized the channel.

The reason for the protocol's requirement that prohibits AP__1 from transmitting is to avoid harmful interference to the AP__2's session, as well as in consideration of a possible harmful interference of AP__2 transmission to AP__1's contemplated package delivery.

It is noted that in cases depicted in FIG. 1A, such mutual harmful interference are not likely to affect the success of actual downlink reception by the respective STAs, being out of range; however, AP__1 101 access to the channel is prohibited in order to guarantee the ACK 110 response from STA__2 104 will not be jammed. Specifically, in the example of FIG. 1A AP__1's 101 harmful interference 109 toward AP__2 103, may jam STA__2 ACK 110 reception by AP__2's receiver resulting in a need for retransmission.

Figure 1B:
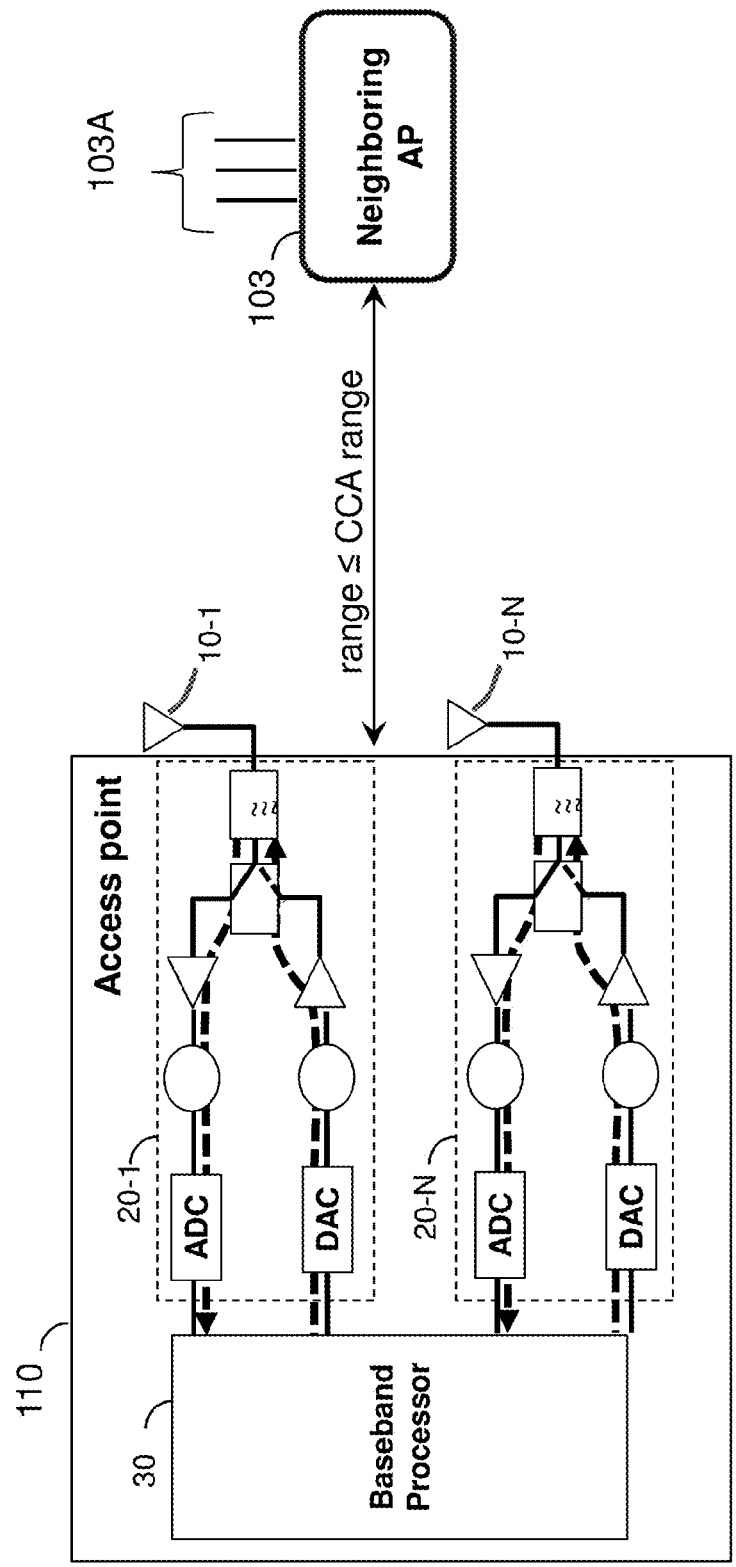
FIG. 1B is a block diagram illustrating an access point with transmit and receive MIMO capability.

FIG. 1B is a block diagram illustrating an AP 110 within CCA range of a neighboring AP 103, in accordance with some embodiments of the present invention. AP 110 may include for example a plurality of antennas 10-1 to 10-N, a plurality of radio circuitries 20-1 to 20-N configured to transmit and receive signals via a plurality of antennas 10-1 to 10-N in compliance with the IEEE 802.11 standard, and a baseband processor 30. AP 110 may be configured to transmit and receive signals within a clear channel assessment (CCA) range of neighboring AP 103 which has a plurality of antennas and may be configured to transmit and receive signals in a co-channel shared with AP 110 in compliance with the IEEE 802.11 standard.

Baseband processor 30 may be configured to monitor signals received by the radio circuitries 20-1 to 20-N and generate a set or list of neighboring co-channel access points that each has plurality of antennas and are further located within a clear channel assessment (CCA) range of the access point. Baseband processor 30 may be further configured to instruct radio circuitries 20-1 to 20-N to transmit a sounding sequence to the list of neighboring access points, and receive Channel State Information (CSI) therefrom. The sounding sequence being a sequence of control frames sent to beamformees and data frames indicative of the channel from the beamformee.

Figure 2:
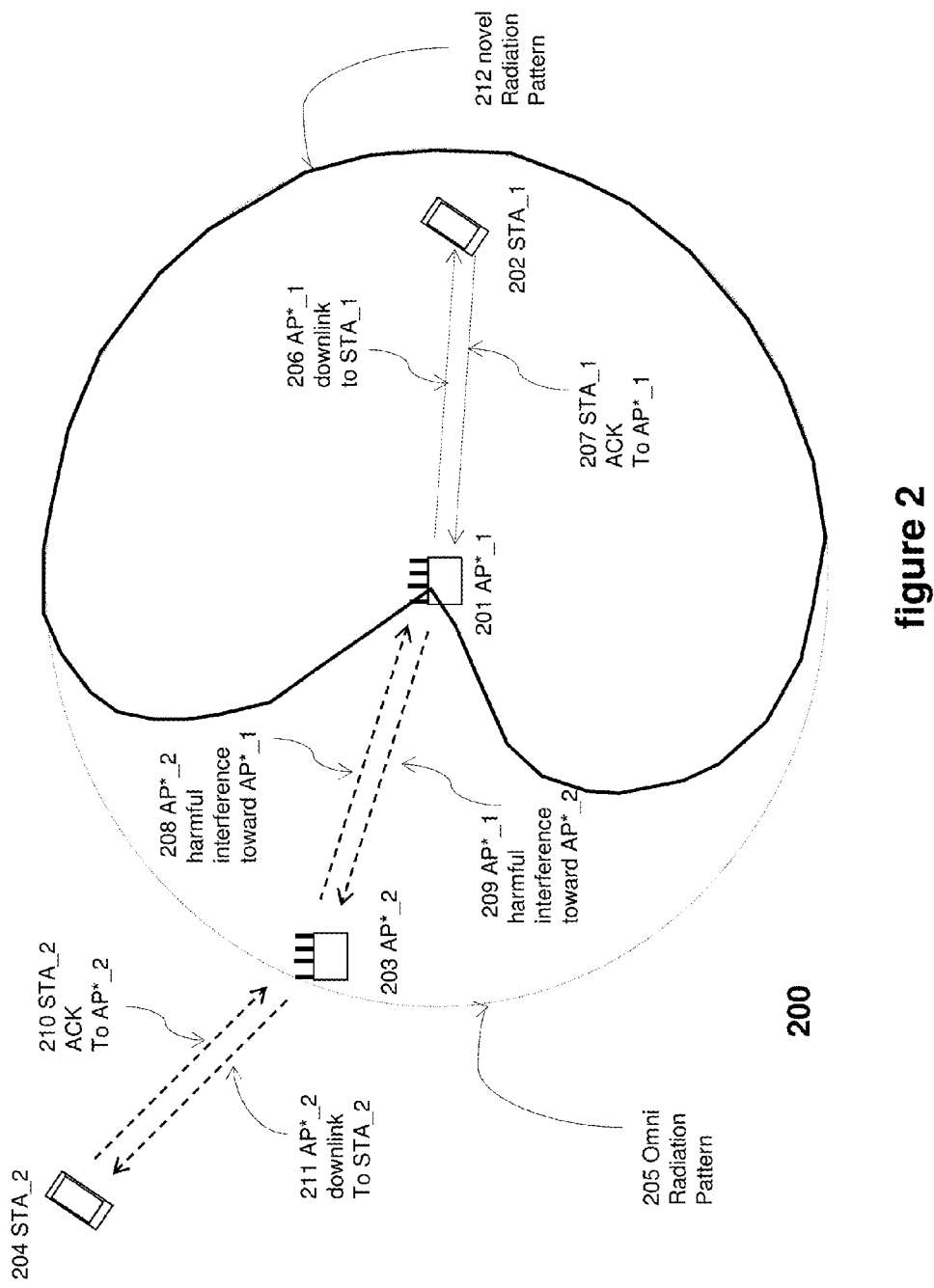
FIG. 2 is a block diagram illustrating an example of the effect of using nulling in accordance with some embodiments of the present invention.

FIG. 2 is a block diagram in which the baseband processor may further be configured to set weights on the radio circuitries to produce a null at one or more receiving antennas of the listed neighboring access point which currently transmits on the same frequency channel. The FIG. 2 layout describes an apparatus that is similar to the one illustrated in FIG. 1A, but with APs equipped with features according to embodiments of the present invention labeled AP*__1 201 and AP*__2 203 respectively. These features may allow an AP to use another AP's busy channel under certain conditions. Embodiments of the present invention are based on AP*__1 201 driving a null on both the receive and the transmit paths, towards AP*__2 203, thus protecting both of their ACK receptions, 207 and 210, from each other's transmissions. When AP*__1 Omni radiation pattern 205 is replaced by novel radiation pattern 212 in both up and down links, then both 208 and 209 harmful interference signals are reduced. When such a reduction is estimated by AP*__1 201 to reach a level that allows both ACK 210 and ACK 207 to be successfully received, and when other conditions described below are met, then AP*__1 201 may proceed to download a packet to STA__1 202, while AP*__2 203 is downloading its packet to STA__2 204. It is noted that the aforementioned nulling is based on cooperative process between the participating APs which belong to the same AP Sounding Set (APSS), as will be detailed herein.

According to some embodiments, an explicit sounding process invoked between the access point and each of the listed neighboring access points.

Figure 3:
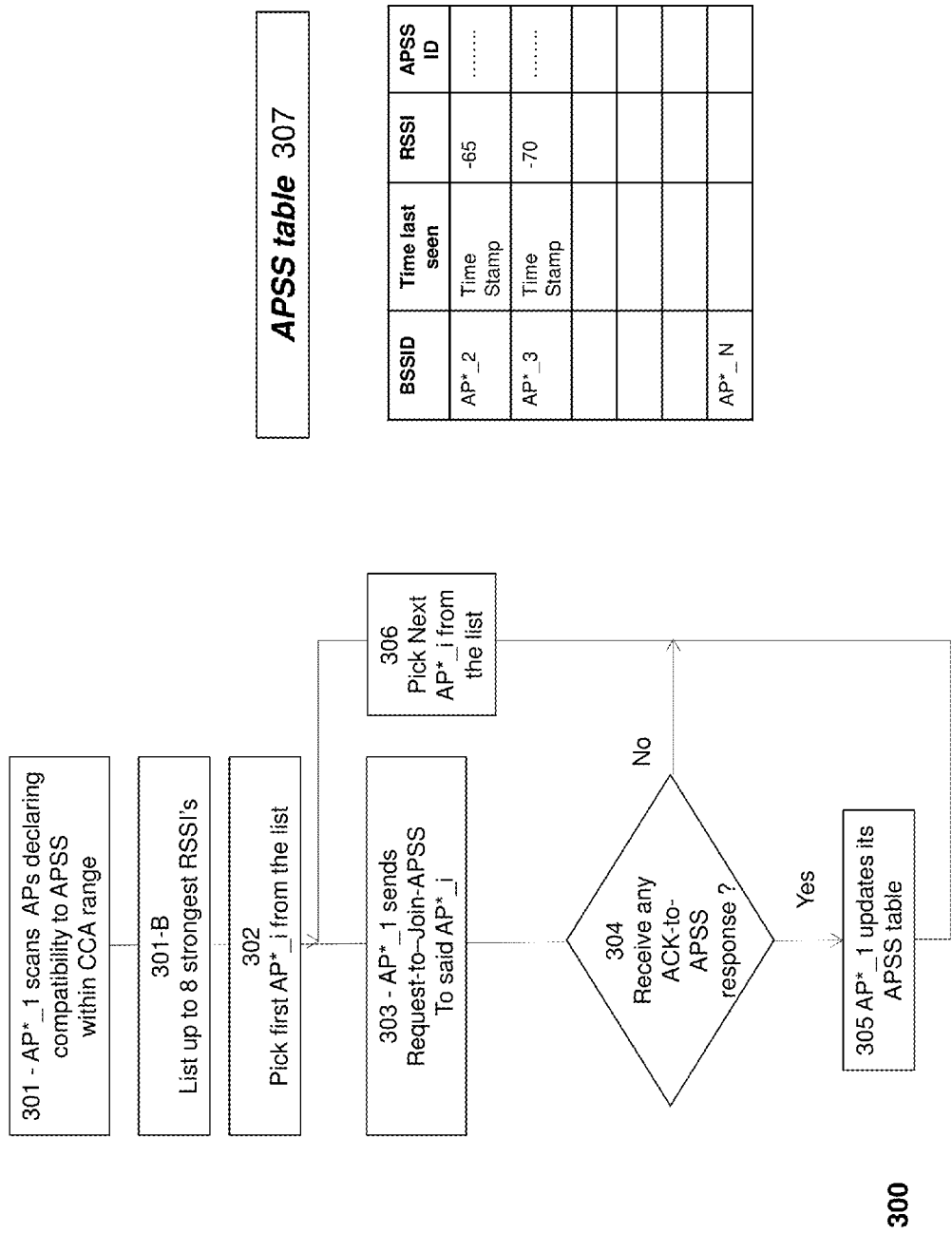
FIG. 3 is an initialization phase in accordance with some embodiments of the present invention.

FIG. 3 is a flowchart illustrating a high level process according to embodiments of the invention of inviting and accepting of sounding invitations between APs that are equipped with the aforementioned cooperative nulling capability, committing to respond to sounding requests from other set members. Embodiments of the process 300 start with scanning all neighboring APs that are APSS compatible and are within CCA range 301. Then, a list up to 8 strongest RSSI's (or a different number) is generated 301-B. Then the first AP*_i from the list is being picked from the list 302. AP*__1 then sends Request-to-Join-APSS to the picked AP*_i 303. An AP*_i which receives a Request-to-join, may respond with ACK-to-APSS, or alternatively, may not respond; in one embodiment, such a decision is based on limiting the response to the immediate neighboring AP*_i which project the most interference, for example limit to 4 APs with the strongest RSSI.

In a case that AP*__1 receives any ACK-to-APSS response 304, AP*__1 updates its APSS table 305. In a case AP*__1 does not receive any ACK-to-APSS response, the next AP*_i from the list is being picked and the method goes on to the AP*__1 sending Request-to-Join-APSS to the picked AP*_i 303 and so forth. When a Request-to-Join is not being responded with ACK-to-APSS, AP*_i may re-send the Request-to-Join several times, (e.g. resending the Request-to-Join three times, each request being sent a few milliseconds after the previous request) before proceeding to next neighboring AP*_i 306, and revisit the non-responding AP*_i after an extended time period, e.g. 1 minute.

One embodiment of the invention has APSS compatible AP indicate their capability by a flag set in a vendor specific information element (for example Element Identifier (ID) 122) in the beacon management frame (See e.g. FIG. 11), in which case only APSS capable APs within CCA range are probed with a Request-to-Join-APSS (AP Sounding Set) 303. APs that are within reception range may elect to respond with ACK-to-APSS 304; APs that elect to respond are doing it with a ACK-to-APSS 304, and then time stamping and RSSI are logged per BSSID 305 as outlined in table 307 of the figure.

Once the list of APSS is established, each AP*_i can try to access an occupied channel following the APSS procedure which is based on expanding the 802.1ac multi-user-MIMO (MU_MIMO) explicit sounding.

In essence, the APSS process in one embodiment differs from the existing MU-MIMO by replacing one of the simultaneously served STAs with a neighboring AP; specifically, an AP that is capable of serving L simultaneous STAs, is configured to serve only L-1 STAs while nulling a neighboring AP which is currently occupying the channel.

Figure 4:
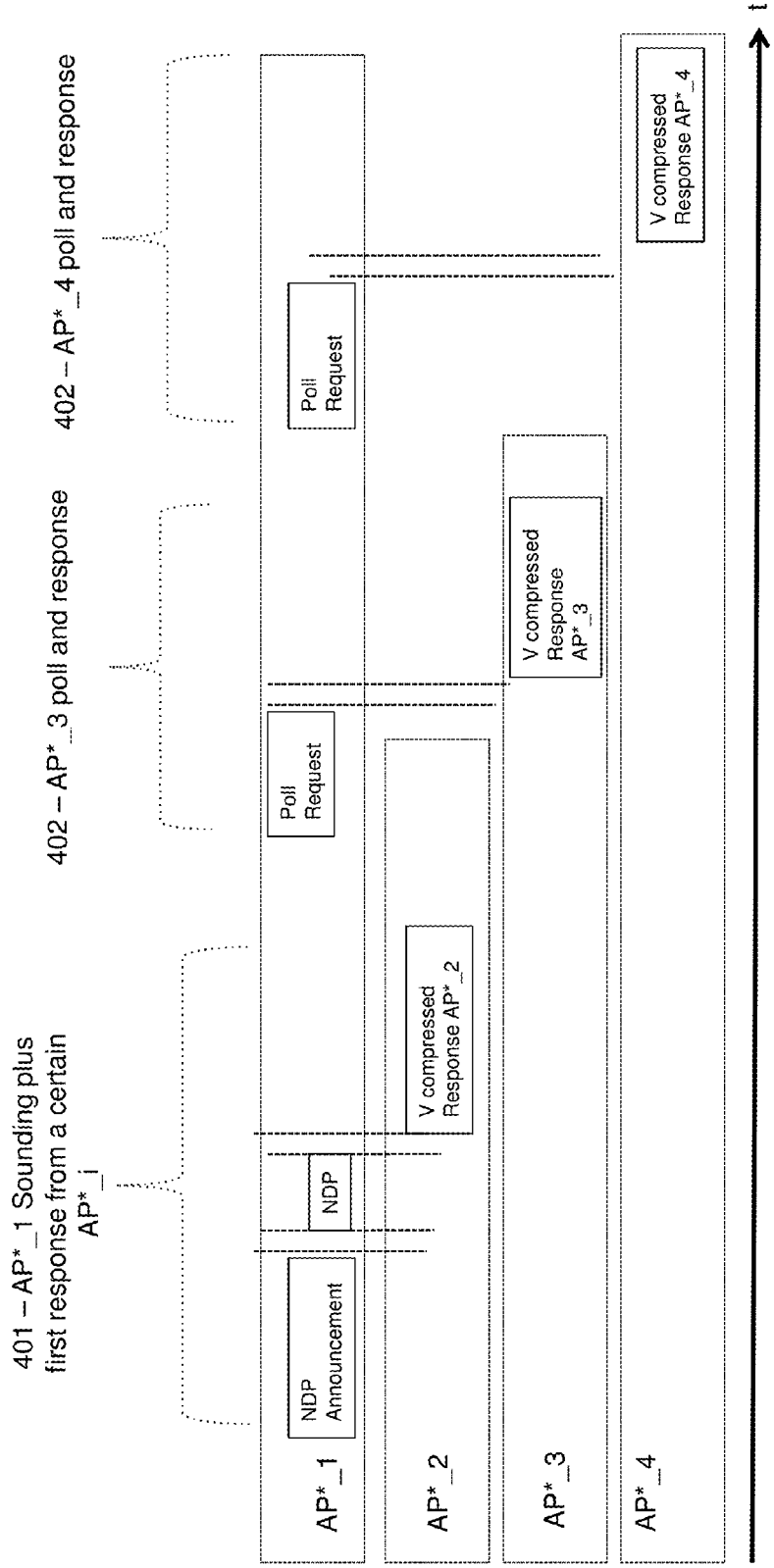
FIG. 4 is an example of APSS message flow in accordance with some embodiments of the present invention.

FIG. 4 is a diagram illustrating protocol sequence enabling embodiments of the present invention. Specifically, APs that adhere to APSS require air protocol modifications that support AP to AP explicit sounding as described in the invention. In the example shown, and similarly to MU-MIMO (IEEE 802.11ac), AP*_1 issues an NDP Announcement to several APs in APSS. As opposed to MU-MIMO, one of these nodes is not a client STA, but rather a given AP*_i. As shown in the example, the first to respond is the AP*_2, and following are polling and responses towards and from AP*_3's, and subsequently to AP*_4. In another embodiment, this order may be altered.

According to some embodiments of the present invention, beamformer AP*_1 may send an NDP announcement to the listed neighboring beamformees APs, followed by an NDP, and a compressed matrix V representing the channel response (herein: compressed V response) from a first neighboring AP*_i and a series of poll requests to a next beamformee neighboring AP*_i and a corresponding V compressed response, until all listed neighboring beamformees neighboring APs are polled and all V compressed responses are consummated.

Figure 5:
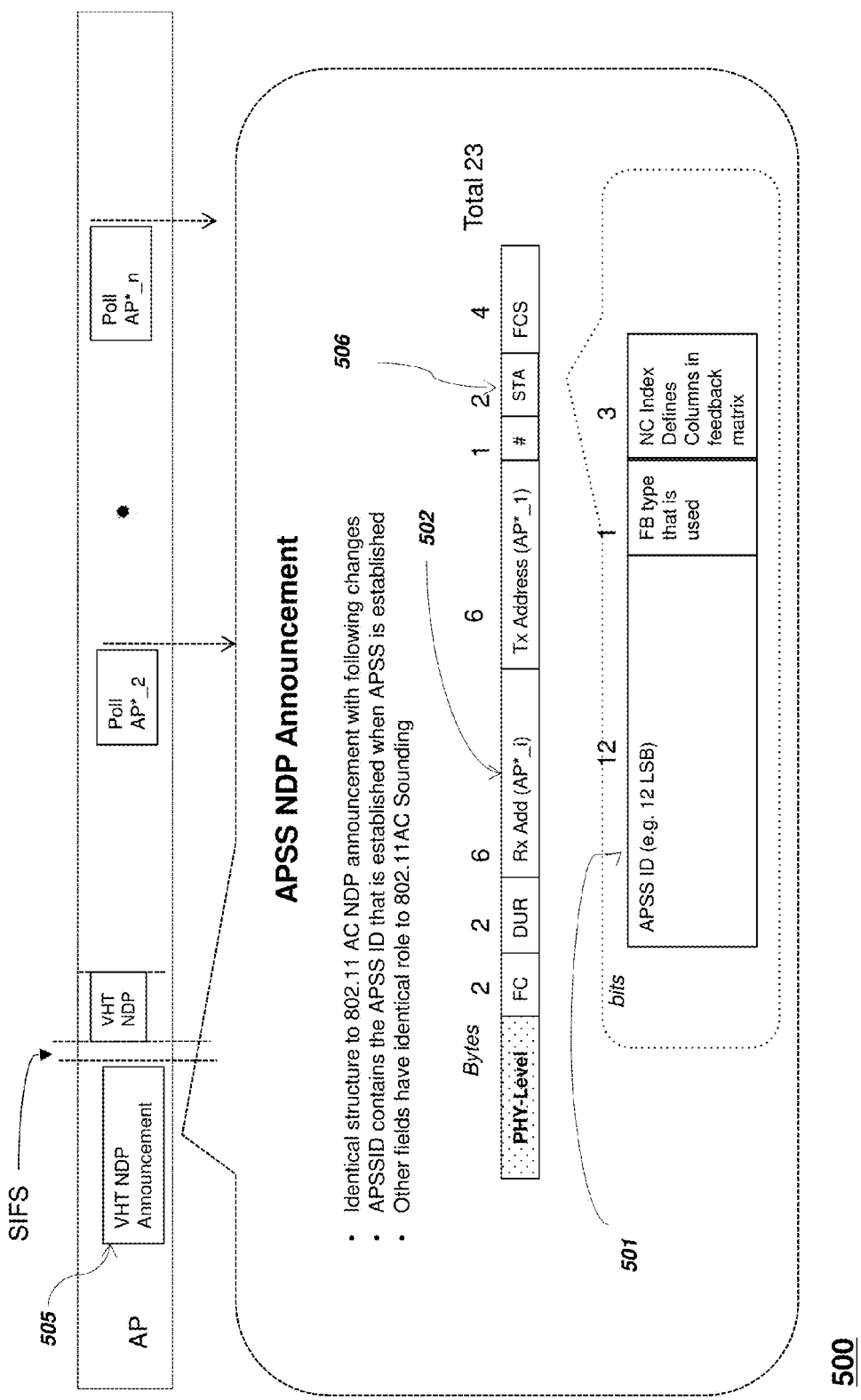
FIG. 5 is an APSS sounding announcement in accordance with some embodiments of the present invention.

FIG. 5 is a timing diagram 500 illustrating a modification of the MU-MIMO protocol in the NDP announcement field 505, facilitating an APSS messaging in accordance with embodiments of the present invention. The NDP announcement exhibits an identical structure to 802.11 AC NDP announcement with following changes: APSSID contains the APSS ID that is established when APSS is established while other fields have identical role to 802.11AC sounding.

More specifically, the two byte STA field 506 of the MU-MIMO protocol is retrofitted into a APSS ID field 501, rather than a STA field, containing similar structure, i.e. a subfield APSS ID (e.g. 12 bits), a subfield indicating the FB feedback type being used (e.g. 1 bit), and a subfield NC the Number of Columns in the feedback matrix (e.g. 3 bits).

According to some embodiments of the present invention, the APSS NDP announcement and NDP may include an APSS ID field replacing in the MU MIMO protocol the STA ID field.

Figure 6:
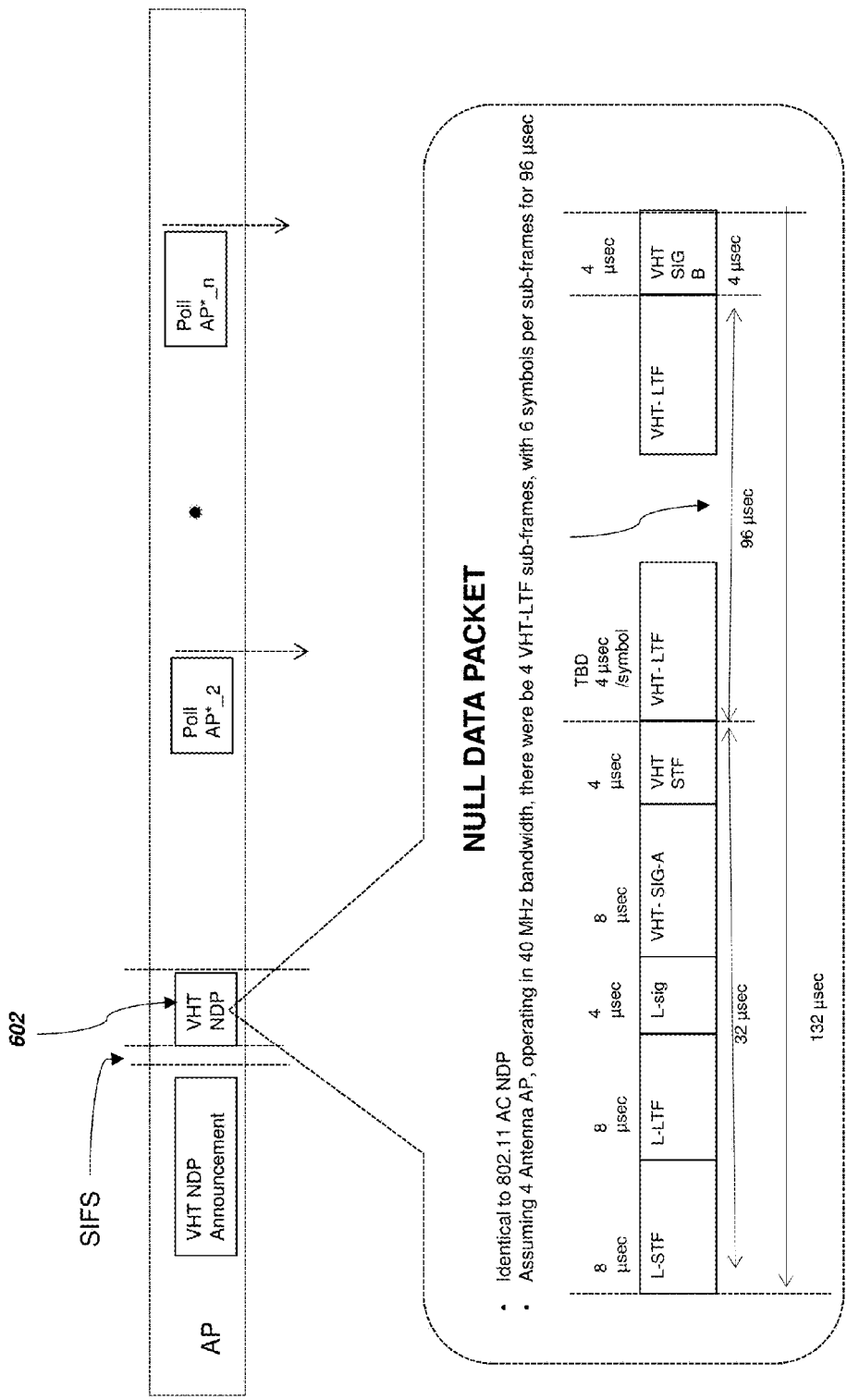
FIG. 6 is an APSS Null Data Package in accordance with some embodiments of the present invention.

FIG. 6 is a timing diagram 600 illustrating the MU-MIMO protocol. NDP 602 according the MU-MIMO protocol is shown here in detail illustrating that the APSS process remains unchanged and specifically it is identical to the MU-MIMO corresponding field of IEEE 802.11 ac. By way of non-limiting example, assuming a 4 antenna AP, operating in 40 MHz bandwidth, there would be 4 VHT-LTF sub-frames, with 6 symbols per sub-frames for 96 μsec as illustrated herein.

Figure 7:
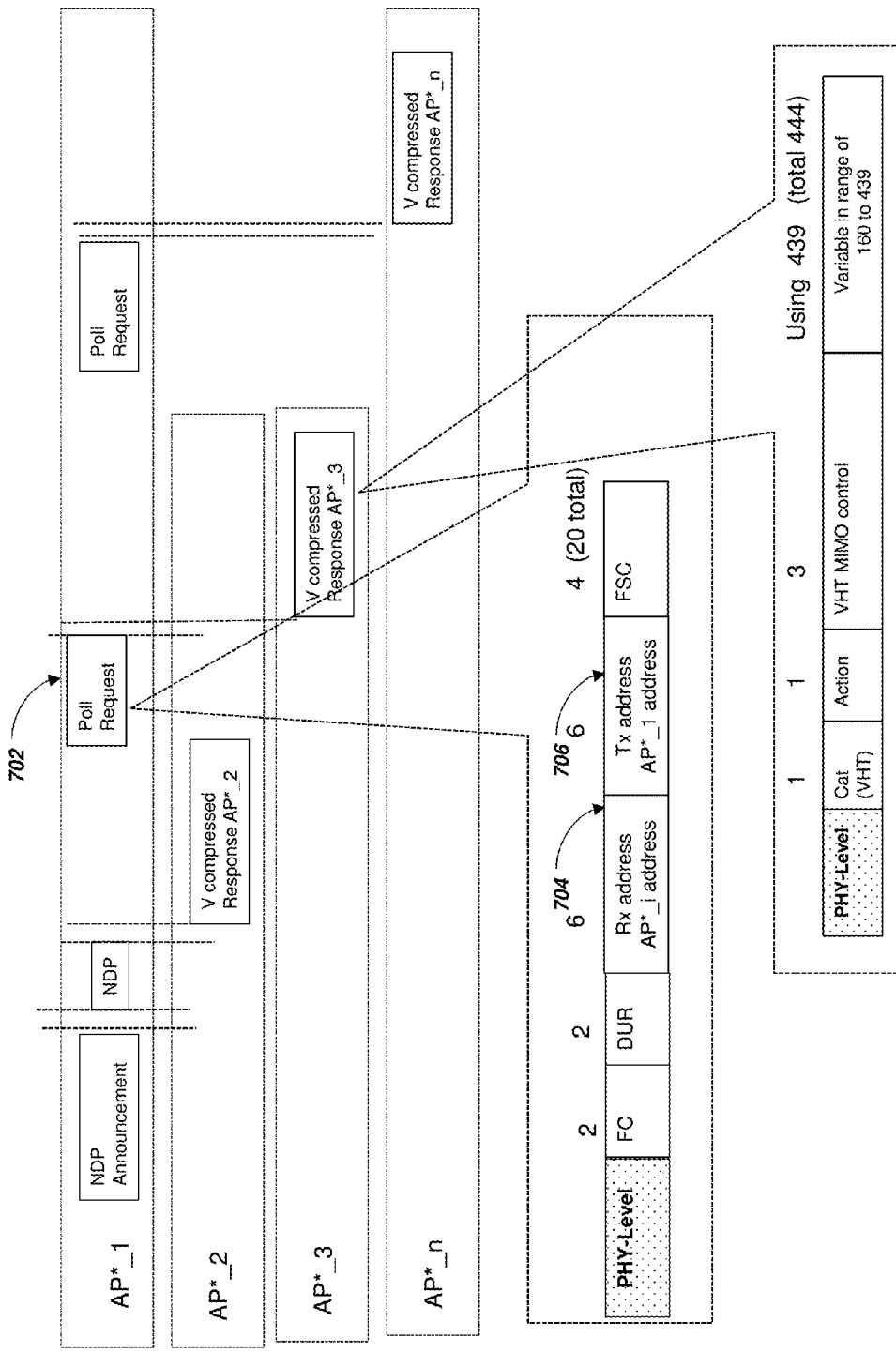
FIG. 7 is an APSS feedback in accordance with some embodiments of the present invention.

FIG. 7 is a timing diagram 700 illustrating a breakdown of the Poll Request field 702. According to some embodiments of the present invention, the Poll Request field may be retrofitted (e.g., used for a different purpose without altering the basic structure of the protocol and its fields) to address neighboring beamformees APs rather than STAs in the MU MIMO protocol. Specifically, fields 704 and 706 that were originally reserved for STAs in the MU-MIMO protocol are now reserved for APs.

There is a set of topologic conditions and qualifications that are verified before an AP*_1 may perform an APSS process and access the busy channel: the beamformer AP is outside the CCA range of the STA currently served by the beamformee AP; the beamformee AP is outside the CCA range of the STA to be served by the Beamformer AP; both served STAs are verified to be located closer than the edge of their serving cells, since their corresponding AP*'s' sensitivity is slightly reduced by minor residual interference caused by the APSS process conditions are outlined as follows:

Beamformer AP identifies the Beamformee served station by decoding the destination field, and either does not identify such a STA MAC address in its neighborhood, or receives it at RSSI<CCA level;

Beamformer AP identifies the MCS transmitted by the Beamformee AP to its served STA, and uses it in order to calculate the proximity of said STA to the Beamformee's cell edge, e.g. low MCS may indicate large range, and if so, will refrain from accessing the channel;

The beamformer AP will use RTS/CTS for serving the STA it is intending to download data to, in order to make sure said STA will not be jammed by the beamformee AP; and The beamformer AP will gauge the RSSI of the CTS coming from the STA it is intending to serve, calculates the proximity of the STA to the beamformer AP's cell edge, in which case it will refrain from accessing the channel.

Additionally, in order to guarantee the AP*_i session is not harmed by the AP*_1 access, a null depth verification and validation is required.

Figure 8A:
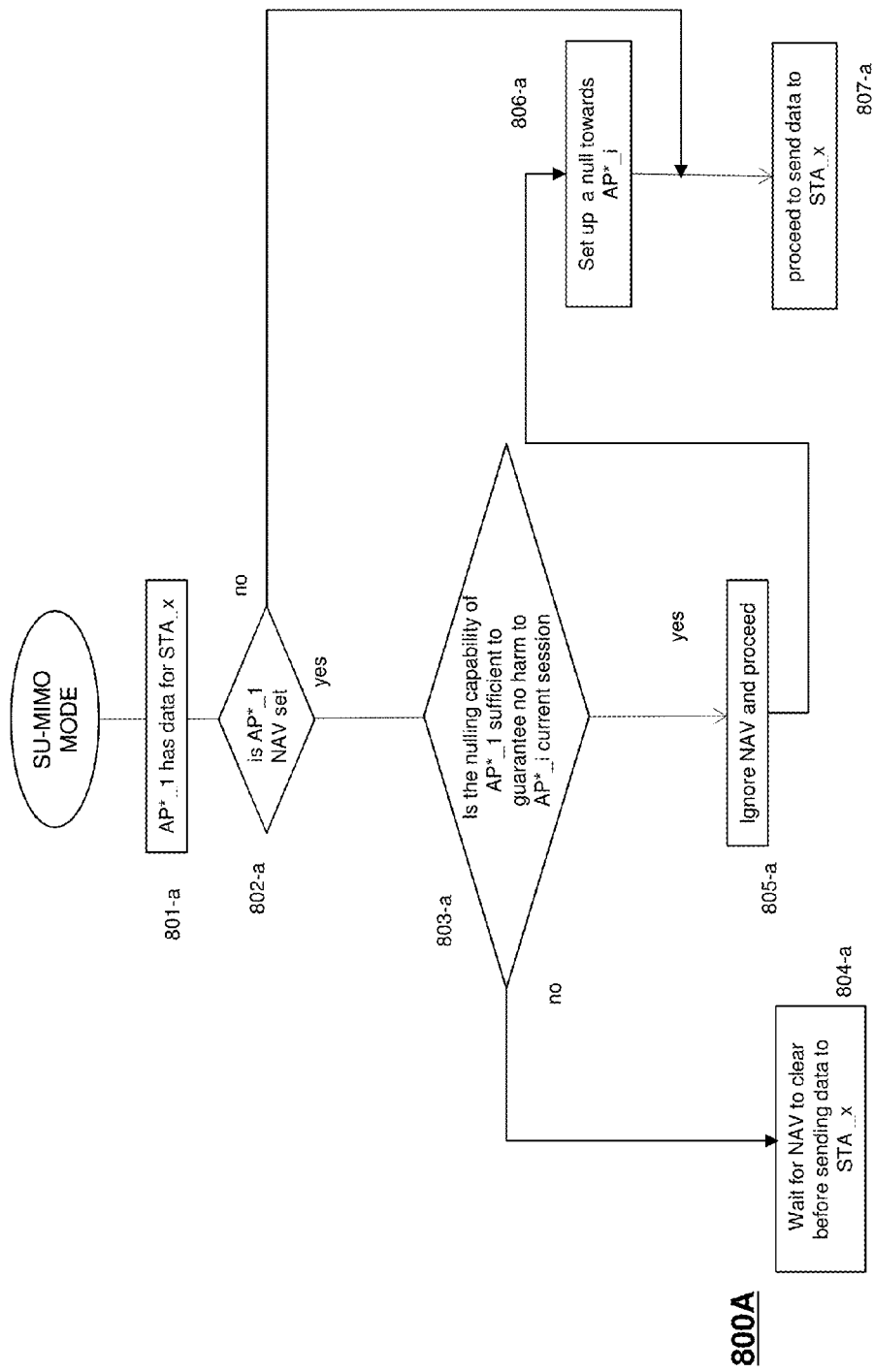
FIG. 8A is a flow chart for an AP serving a single STA at a given time (SU-MIMO) in accordance with some embodiments of the present invention.
Figure 8B:
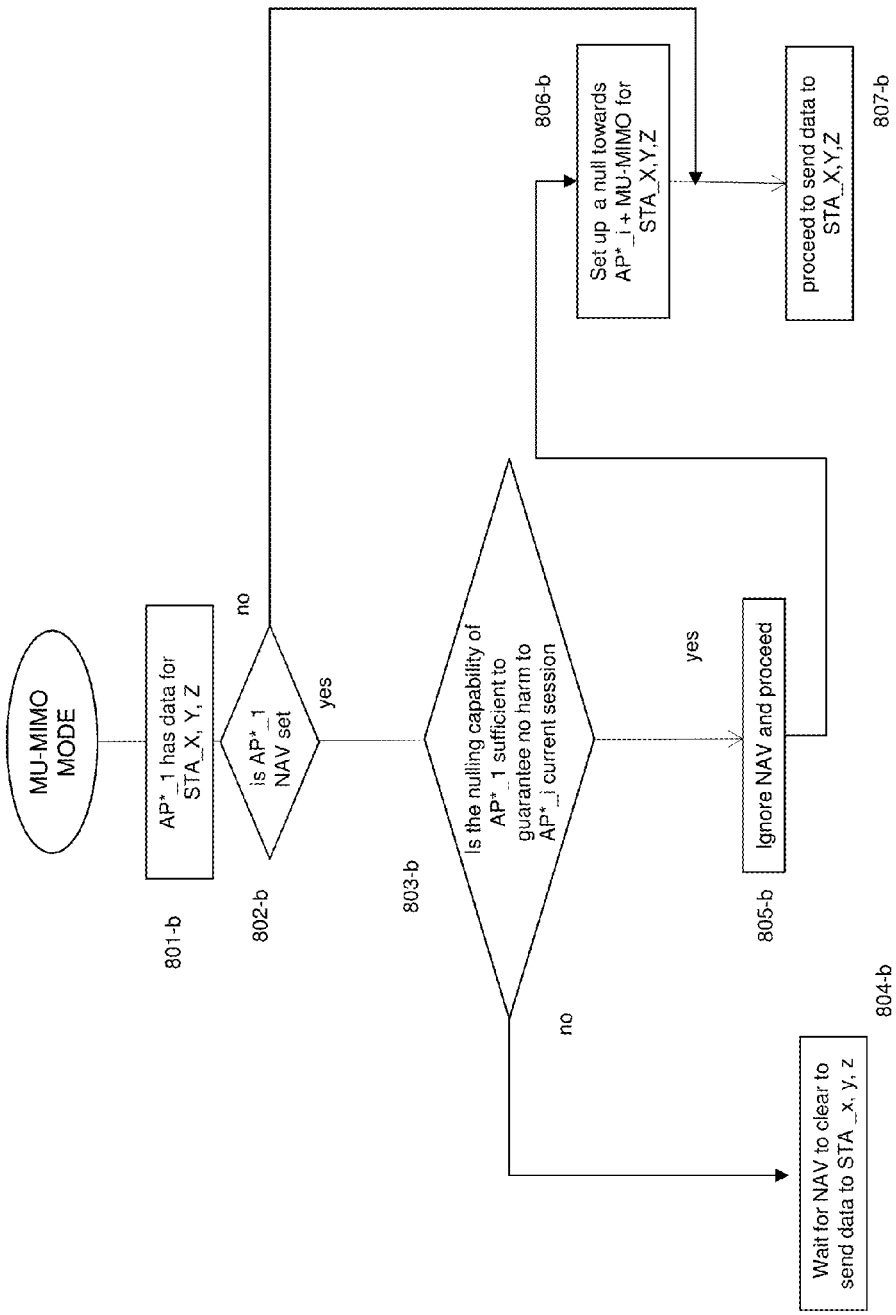
FIG. 8B is a flow chart for an AP serving multiple simultaneous STAs (MU-MIMO) in accordance with some embodiments of the present invention.

FIGS. 8A and 8B outline the sequence for a Single User MIMO (SU-MIMO) service with nulling of a neighboring AP, and a Multi User MIMO (MU-MIMO) service with nulling of a neighboring AP, respectively, according to embodiments of the present invention. Within the first few microseconds of the APSS process, phase and amplitude information accuracy are considered virtually perfect, and capable of yielding a very deep null (e.g. better than 30 dB).

FIG. 8A illustrates flowchart 800A for SU-MIMO mode. In step 801-*a* AP*_1 has data for STA_x. In step 802-*a* the AP*_1 NAV is checked whether it is set or not. In a case that the NAV is set, in step 803-*a* it is checked whether the nulling capability of AP*_1 is sufficient to guarantee no harm to AP*_i current session. In a case it is sufficient, in step 805-*a* the NAV is ignored and the nulling process proceeds to step 806-*a* for setting up a null towards AP*_i and further to step 807-*a* to sending data to STA_x. In a case that AP*_1 NAV is not set, the process goes on directly to step 807-*a* to sending data to STA_x. In a case that the nulling capability of AP*_1 is insufficient to guarantee no harm to AP*_i current session, the process goes on to step 804-*a* to waiting for the NAV to clear before sending data to STA_x.

FIG. 8B illustrates flowchart 800B for MU-MIMO mode. In step 801-*b* AP*_1 has data for STAs_x, y, and z. In step 802-*b* the AP*_1 NAV is checked whether it is set or not. In a case that the NAV is set, in step 803-*b* it is checked whether the nulling capability of AP*_1 is sufficient to guarantee no harm to AP*_i current session. In case it is sufficient, in step 805-*b* the NAV is ignored and the nulling process proceeds to step 806-*b* for setting up a null towards AP*_i and further to step 807-*b* to sending data to STAs_x, y, and z. In a case that AP*_1 NAV is not set, the process goes on directly to step 807-*b* to sending data to STAs_x, y, and z. In a case that the nulling capability of AP*_1 is insufficient to guarantee no harm to AP*_i current session, the process goes on to step 804-*b* to waiting for the NAV to clear before sending data to STAs_x, y, and z.

As a non-zero time has elapsed between such last APSS channel estimation and the usage of the acquired weights for nulling, a null deterioration estimation is performed as described below, and then a nulling capability is calculated as described further, yielding actual null depth figure of merit $Null\_{depth}$.

Therefore, proceeding to AP*_1 access of the occupied channel, is conditioned by measuring $RSSI_{AP*\_i}$ of the AP*_i as received by AP*_1, and verifying that $RSSI_{AP*\_i}$-$Null\_{depth}$<CCA Level (e.g. −82 dBm), or another agreed upon dynamically calculated CCA Level.

According to some embodiments of the present invention, a decision to access a channel occupied by a listed compatible neighboring AP within CCA range, may be subject to verification and validation of the access point null's capability to reduce the interference caused by the access point to the neighboring AP below CCA Level, for at least one of the neighboring AP antennas.

According to some embodiments of the present invention, the access point may be configured to keep or store records (e.g. on a memory) of fading rates of each listed compatible neighboring APs within CCA range, in terms of amplitude and phase variation over time, and further calculates for each of the listed neighboring APs the standard deviation 1σ, 2σ, 3σ of the amplitude and phase variations, and further estimates a corresponding amplitude and phase drift rate.

According to some embodiments of the present invention, the access point may be further configured to keep or store records of fading rates of each listed compatible neighboring APs within CCA range, in terms of amplitude and phase variation over time, and further calculates for each of the listed compatible neighboring AP within CCA range the standard deviation 1σ, 2σ, 3σ of the amplitude and phase variations, and further estimates a corresponding amplitude and phase drift rate.

According to some embodiments of the present invention, the access point may be further configured to estimate the nulling capability by calculating the time elapsed between the last sounding of the compatible neighboring AP within CCA range and the time the condition is being examined, apply the amplitude and phase drift rate, and further estimates the null depth degradation, caused by the accumulated drift, yielding actual null depth.

According to some embodiments of the present invention, the access point may be further configured to null compatible neighboring AP within CCA range while downloading a packet to served STA, in a case where the neighboring AP RSSI−Actual Null Depth<CCA Level, provided several predefined topologic conditions are met.

According to some embodiments of the present invention, the topologic conditions may be defined as, for example: (i) the access point is not within CCA range of the STA served by compatible neighboring AP within CCA range (ii); the neighboring AP is not within CCA range of the STA or STAs about to be served by the access point (iii); and/or the served STAs are not on their servicing cell's edges.

AP*_1 may perform periodical APSS sounding process with a given AP*_i, when the AP*_i is not transmitting; such period are preferably done at intervals larger than the maximum packet duration (e.g. 7 ms or more).

According to some embodiments of the present invention, the access point may perform the sounding of the listed neighbors that have agreed to join the APSS, on a periodic basis, whenever a given compatible neighboring AP within CCA range is not transmitting. Such periods are preferably carried out at intervals longer than the maximum packet duration (e.g. 7 ms or more).

According to some embodiments of the present invention, the access point may be configured to limit a number of responses produced by it so as to allocate up to approximately 10% of a transmitting time to respond to sounding requests from the listed neighboring access points.

According to some embodiments of the present invention, the sounding of the listed neighboring access points may be performed based on IEEE 802.11ac MU MIMO sounding procedure, wherein the access point may respond to a limited number of compatible neighboring APs, including up to eight strongest RSSIs.

According to some embodiments of the present invention, the access point may carry out an actual download of a packet to a STA, or a group of STAs, while the channel may be occupied by a compatible neighboring AP within CCA range, may be carried out with such antenna pattern that may minimize the power received by at least one of the neighboring AP antennas.

Following fading fluctuation over time, and average time interval between consecutive APSS sounding, a phase and amplitude gradients are calculated (e.g. standard deviation 1σ, 2σ, 3σ), and applied to a null deterioration chart (See FIG. 10), yielding null depth figure of merit.

Figure 9:
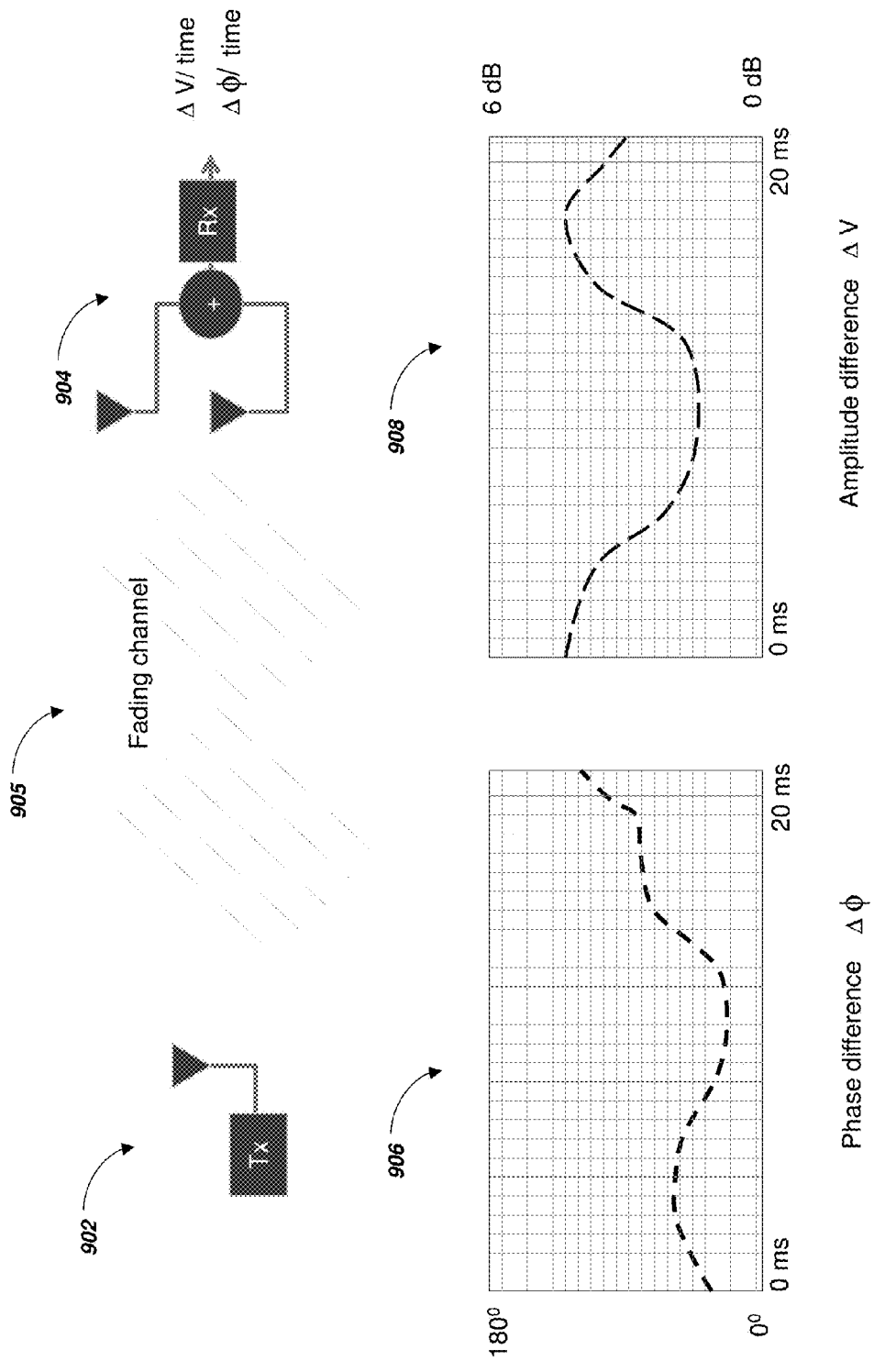
FIG. 9 is an example of fading gradient in accordance with some embodiments of the present invention.

FIG. 9 is a diagram 900 illustrating AP*_1 assessment process of fading, according to embodiments of the present invention, based on logging phase and amplitude differences between pairs of antennas, and determining fluctuations over time. Transmitter 902 being an AP*_1 transmits a fading channel 905 to receiver AP*_i 904. Fluctuations are shown over time in a phase diagram 906 and amplitude diagram 908. In one embodiment, such fluctuations are calculated as peak-to-peak phase changes over 5, 10, 20 and 50 ms wherein the largest 10 percent are not considered (e.g. within two standard deviations 2σ), yielding possible accumulated phase and amplitude errors.

Figure 10:
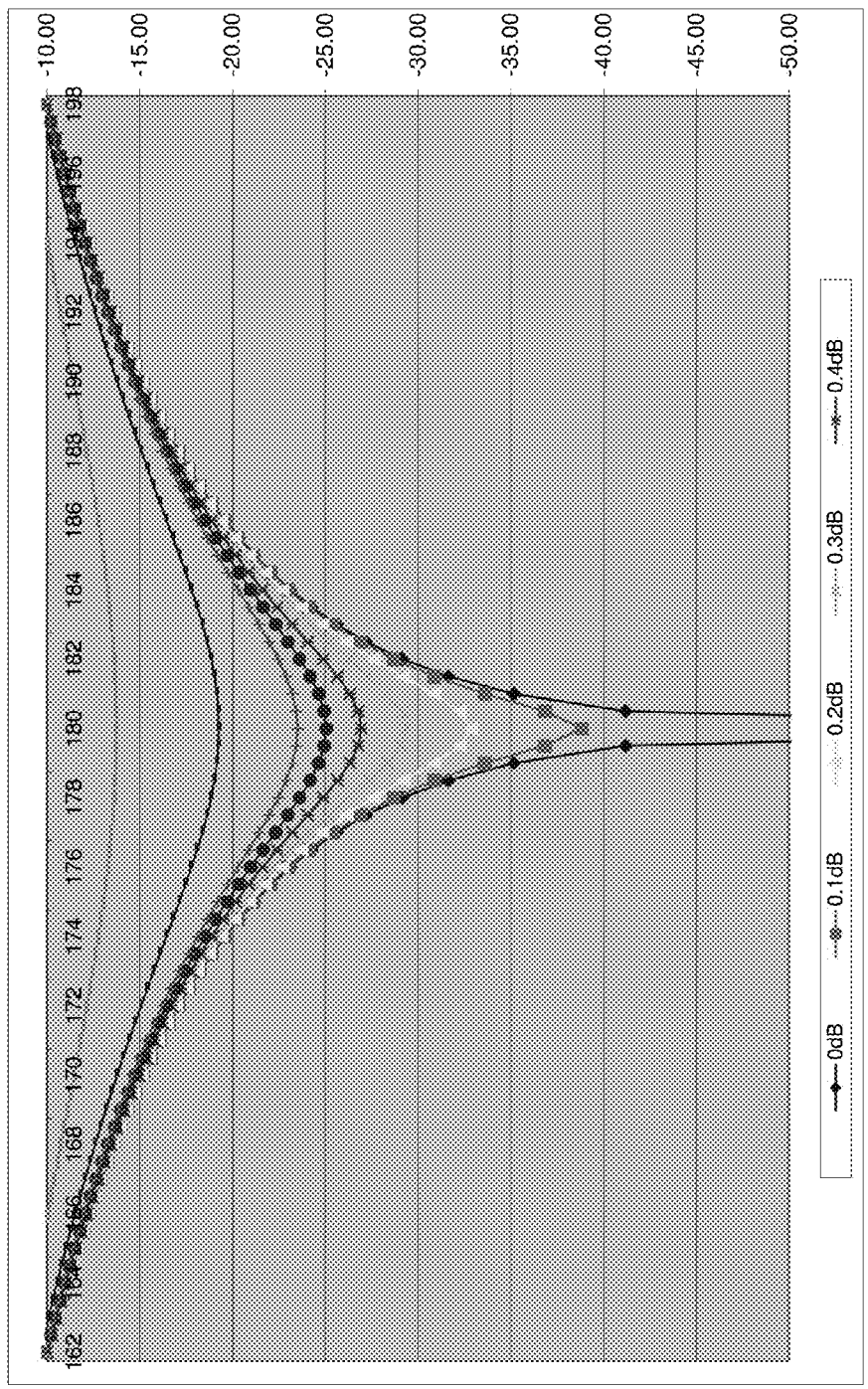
FIG. 10 is a null deterioration chart as a function of phase and amplitude imbalance, in accordance with some embodiments of the present invention.

FIG. 10 is a graph diagram 1000 illustrating an example of resultant calculations applied to calculation formula that estimates a null deterioration in dB (vertical axis) versus phase and amplitude setting inaccuracy in degrees (horizontal axis), the different lines indicate different gains in dB. When applying phase and amplitude imbalance, an effective or actual null depth is derived, and then a nulling capability is verified as follows: $RSSI_{AP*\_i}$-$Null\_{Depth}$ must in some embodiments be lower than allowed CCA Level, in order to allow AP_*1 to proceed to accessing the busy channel.

Figure 11:
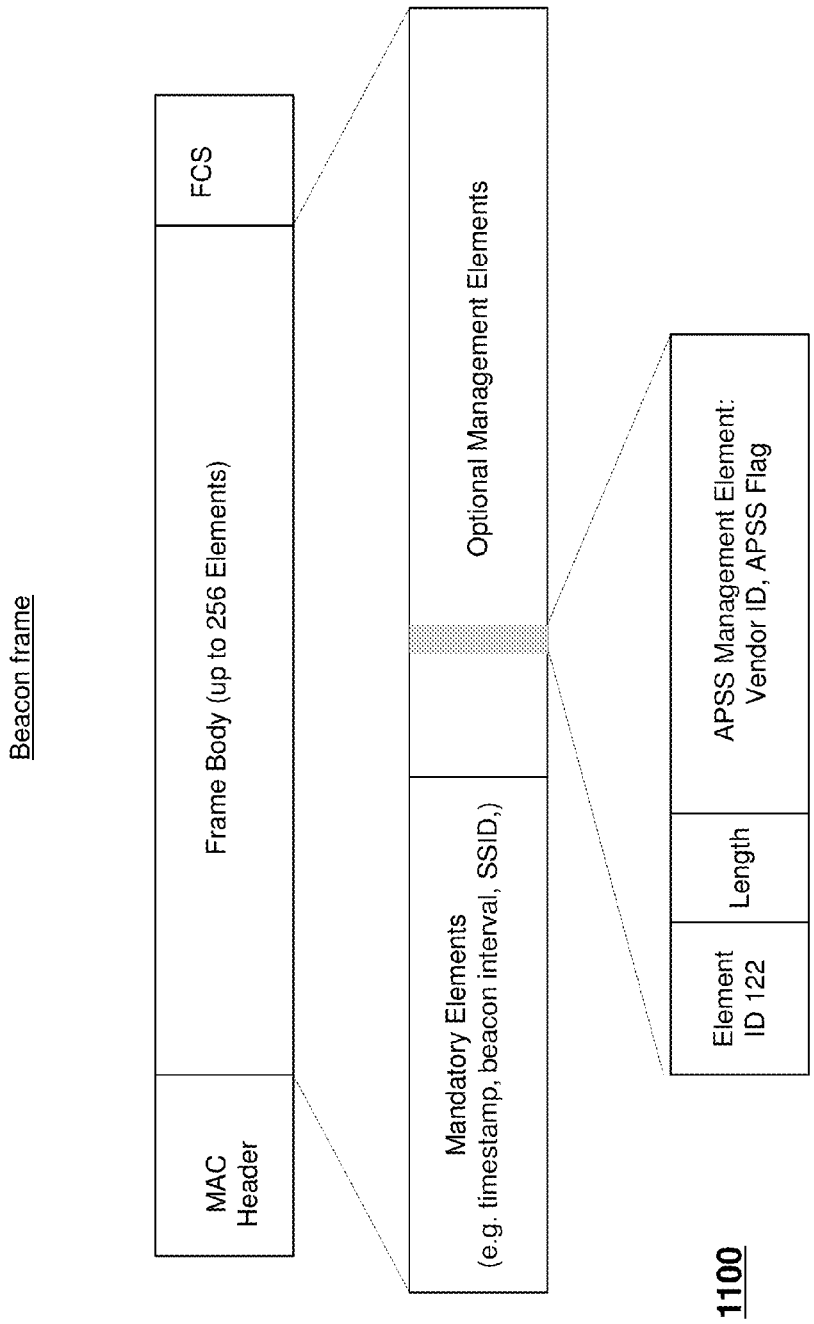
FIG. 11 shows the structure of the Beacon frame, where APSS capability is indicated in the optional vendor specific portion of the frame in accordance with some embodiments of the present invention.

FIG. 11 is a diagram illustrating the structure of the 802.11 Beacon Frame 1100 in accordance with embodiments of the present invention. This frame is transmitted by all 801.11 APs at a periodic rate, typically 10 times per second. This beacon includes mandatory information such as the SSID of the AP but can optionally include other information, e.g. vendor specific data. Typically the vendor specific data may start with a device/vendor ID followed by a flag to indicate APSS capability. Where APSS becomes standardized, a specific Information Element ID could be assigned to indicate capability rather than embedding this information in a vendor specific data element.

According to some embodiments of the present invention, the access point may include: a plurality of antennas; a plurality of radio circuitries configured to transmit and receive signals via the plurality of antennas; and a baseband processor configured to monitor signals received by the radio circuitries and generate a list of neighboring co-channel access points that each has plurality of antennas and are further located within a clear channel assessment (CCA) range of the access point.

The baseband processor may further be configured to instruct the radio circuitries to transmit a sounding sequence to the list of compatible neighboring access points, and receive Channel State Information (CSI) from the compatible neighboring access points, wherein the compatible neighboring access points indicate having a capability of responding to sounding sequences by transmitting identification of the capability in a beacon management frame. The baseband configuration capabilities may be broadcasted to the compatible neighboring access points via unused bits within the beacon management frame.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, a baseband processor or other processor may be configured to carry out methods of the present invention by for example executing code or software.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An access point comprising:
a plurality of antennas;
a plurality of radio circuitries configured to transmit and receive signals via the plurality of antennas; and
a baseband processor configured to monitor the signals received by the radio circuitries and generate a list of neighboring co-channel access points, each neighboring co-channel access point having a plurality of antennas and each being located within a clear channel assessment (CCA) range of the access point,
wherein the baseband processor is further configured to instruct the radio circuitries to transmit a sounding sequence to the list of neighboring co-channel access points, and receive Channel State Information (CSI),
wherein the baseband processor is further configured to set weights on the radio circuitries to produce a null at one or more antennas of the listed neighboring co-channel access point which currently transmits on a same frequency channel and downloads of a packet to a station (STA), or a group of STAs, wherein null weights are determined via an explicit sounding process invoked between the access point and each of the listed neighboring co-channel access points, based on a null data packet (NDP) announcement by a nulling AP and response by a nulled AP, wherein the access point sounding set (APSS) NDP announcement and NDP comprise an access point sounding set ID field replacing an STA ID field in a MU MIMO protocol.

2. The access point according to claim 1, wherein a beamformer AP sends an NDP announcement to listed neighboring beamformees APs, followed by an NDP, and a V compressed response from a first neighboring AP and a series of poll requests to a next beamformee neighboring AP and a corresponding V compressed response, until all listed neighboring beamformees neighboring APs are polled and all V compressed responses are consummated, wherein V is a compressed matrix representing the channel response.

3. An access point comprising:
a plurality of antennas;
a plurality of radio circuitries configured to transmit and receive signals via the plurality of antennas; and
a baseband processor configured to monitor the signals received by the radio circuitries and generate a list of neighboring co-channel access points, each neighboring co-channel access point having a plurality of antennas and each being located within a clear channel assessment (CCA) range of the access point,
wherein the baseband processor is further configured to instruct the radio circuitries to transmit a sounding sequence to the list of neighboring co-channel access points, and receive Channel State Information (CSI),
wherein the baseband processor is further configured to set weights on the radio circuitries to produce a null at one or more antennas of the listed neighboring co-channel access point which currently transmits on a same frequency channel and downloads of a packet to a station (STA), or a group of STAs,
wherein null weights are determined via an explicit sounding process invoked between the access point and each of the listed neighboring co-channel access points, based on a null data packet (NDP) announcement by a nulling AP and response by a nulled AP, and a series of poll requests to a next beamformee neighboring AP and a corresponding response, and
wherein a Poll Request field is retrofitted to address a neighboring beamformee AP rather than a STA in a MU MIMO protocol.

4. The access point according to claim 1, wherein the access point performs the sounding of listed neighbors that have agreed to join the APSS, on a periodic basis, when a given compatible neighboring AP within CCA range is not transmitting.

5. The access point according to claim 1, further configured to limit a number of responses produced by the access point so as to allocate up to approximately 10% of a transmitting time to respond to sounding requests from the listed neighboring co-channel access points.

6. The access point according to claim 1, wherein the sounding of the listed neighboring co-channel access points is performed based on IEEE 802.11ac MU MIMO sounding procedure, wherein the access point responds to a limited number of compatible neighboring APs-comprising up to 8 strongest received signal strength indicators (RSSIs).

7. The access point according to claim 1, wherein an actual download of a packet to a STA, or a group of STAs, while the channel is occupied by a compatible neighboring AP within CCA range, is done with such antenna pattern that minimizes the power received by at least one of the neighboring AP antennas.

8. The access point according to claim 1, wherein a decision to access a channel occupied by a listed compatible neighboring AP within CCA range, is conditioned by verification and validation of the access point null's capability to reduce the interference caused by the access point to the neighboring AP below CCA Level, for at least one of the neighboring AP antennas.

9. The access point according to claim 1, the access point being configured to keep records of fading rates of each listed compatible neighboring APs within CCA range, in terms of amplitude and phase variation over time, and further calculates for each of the listed neighboring APs the standard deviation $1\sigma$, $2\sigma$, and $3\sigma$ of the amplitude and phase variations, and further estimates a corresponding amplitude and phase drift rate.

10. The access point according to claim 5, wherein the access point is configured to keep records of fading rates of each listed compatible neighboring APs within CCA range, in terms of amplitude and phase variation over time, and further calculates for each of the listed compatible neighboring AP within CCA range the standard deviation $1\sigma$, $2\sigma$, and $3\sigma$ of the amplitude and phase variations, and further estimates a corresponding amplitude and phase drift rate.

11. The access point according to claim 7, further configured to estimate the nulling capability by calculating the time elapsed between the last sounding of the compatible neighboring AP within CCA range and the time the condition is being examined, apply the amplitude and phase drift rate, and further estimates the null depth degradation, caused by the accumulated drift, yielding actual null depth.

12. The access point according to claim 7, further configured to null compatible neighboring AP within CCA range while downloading a packet to served STA, in a case where the neighboring $AP_{RSSI}$-Actual Null Depth<CCA Level, provided predefined topologic conditions are met.

13. The access point according to claim 12, wherein said predefined topologic conditions are defined as: (i) the access point is not within CCA range of the STA served by compatible neighboring AP within CCA range; or (ii) the neighboring AP is not within CCA range of the STA or STAs about to be served by the access point; or (iii) the served STAs are not on their servicing cell's edges.

14. A method of performing an explicit sounding process to neighboring access points by a beamformer access point comprising:
transmitting and receiving signals via a plurality of radio circuitries connected to a plurality of antennas;
monitoring the signals received by the radio circuitries and generating a list of neighboring co-channel access points, each neighboring co-channel access point having a plurality of antennas and each being located within a clear channel assessment (CCA) range of the access point; and
instructing the radio circuitries to transmit a sounding sequence to the list of neighboring co-channel access points, and receive Channel State Information (CSI) from the neighboring access points,
setting weights on the radio circuitries to produce a null at one or more antennas of the listed neighboring co-channel access point which currently transmits on a same frequency channel and download of a packet to a STA, or a group of STAs,
wherein null weights are determined via an explicit sounding process invoked between the access point and each of the listed neighboring co-channel access points, based on a null data packet (NDP) announcement by a nulling AP and response by a nulled AP, and wherein the access point sounding set (APSS) NDP announcement and NDP comprise an access point sounding set ID field replacing an STA ID field in a MU MIMO protocol.

15. The method according to claim 14, wherein the access point performs the sounding on a sequential and periodic basis, when a given compatible neighboring AP within CCA range is not transmitting.

16. The method according to claim 14, wherein the sounding of the listed neighboring co-channel access points is performed based on IEEE 802.11ac MU MIMO sounding procedure wherein the access point is configured to respond to a limited number of immediate compatible neighboring APs-comprising up to 8 strongest received signal strength indicators (RSSIs).

17. The method according to claim 14, wherein an actual download of a packet to a STA, or a group of STAs, while the channel is occupied by an neighboring AP, is done with such antenna pattern that minimizes the power received by at least one of the neighboring AP antennas.

18. The method according to claim 14, wherein a decision to access a channel occupied by a listed a compatible neighboring AP within CCA range, is conditioned by verification and validation of the access point null's capability to reduce the interference caused by the access point to the compatible neighboring AP below CCA Level, for at least one of the neighboring AP antennas.

19. The method according to claim 14, further comprising keeping records of fading rates of each listed a compatible neighboring AP within CCA range, in terms of amplitude and phase variation over time, and further calculates for each of the listed AP the standard deviation $1\sigma$, $2\sigma$, and $3\sigma$ of the amplitude and phase variations, and further estimates a corresponding amplitude and phase drift rate.

20. The method according to claim 19, further comprising keeping records of fading rates of each listed a compatible neighboring AP within CCA range, in terms of amplitude and phase variation over time, and further calculates for each of the listed AP the standard deviation $1\sigma$, $2\sigma$, and $3\sigma$ of the amplitude and phase variations, and further estimates a corresponding amplitude and phase drift rate.

21. The method according to claim 20, further comprising estimating the nulling capability by calculating the time elapsed between the last sounding of the neighboring AP and the time the condition is being examined, apply the amplitude and phase drift rate, and further estimates the null depth degradation, caused by the accumulated drift, yielding actual null depth.

22. The method according to claim 21, further comprising nulling a compatible neighboring AP within CCA range while downloading a packet to served STA, in a case where a compatible neighboring $AP_{RSSI}$–Actual Null Depth<CCA, provided it meets predefined topologic conditions.

23. The method according to claim 22, wherein the predefined topologic conditions are defined as: (i) the access point is not within CCA range of the STA served by a compatible neighboring AP within CCA range; or (ii) the neighboring AP is not within CCA range of the STA or STAs about to be served by the access point; or (iii) the served STAs are not on their servicing cell's edges.

\* \* \* \* \*